May 12, 1942.  H. BANY  2,282,845
CONTROL SYSTEM
Filed June 29, 1939
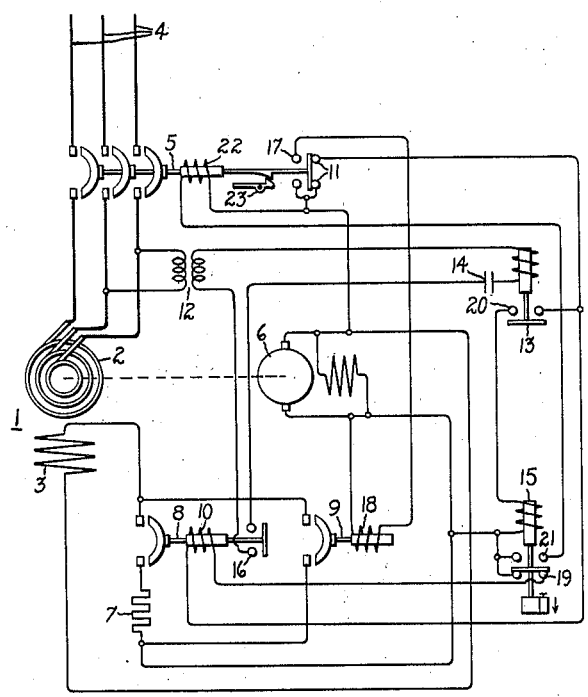
Inventor:
Herman Bany,
by Harry E. Dunham
His Attorney.

Patented May 12, 1942

2,282,845

UNITED STATES PATENT OFFICE 2,282,845

CONTROL SYSTEM

Herman Bany, Lansdowne, Pa., assignor to General Electric Company, a corporation of New York Application June 29, 1939, Serial No. 281,869

8 Claims. (Cl. 171—118)

My invention relates to control systems and particularly to systems for controlling the connections of a synchronous machine in response to the speed thereof.

In self synchronizing systems for synchronous machines it has been the usual practice first to connect the machine, with its field winding unexcited, to the alternating current system when the speed of the machine is above a predetermined value and then to excite the field winding sufficiently to pull the machine into synchronism with the alternating current system. Centrifugally operated switches have been employed for controlling the connection of the machine to the system in response to the speed of the machine. Such switches are generally mounted on the end of the shaft of the machine, so that they increase the over-all dimensions of the machine, which is very undesirable in some cases because space is often a very important factor.

One object of my invention is to provide an improved arrangement for controlling the connections of a synchronous machine in response to the speed thereof which does not require a centrifugally operated switch.

My invention will be better understood from the following description when taken in connection with the accompanying drawing, which shows diagrammatically an automatic self synchronizing arrangement for a synchronous generator embodying my invention, and its scope will be pointed out in the appended claims.

Referring to the drawing, 1 represents a polyphase generator having an armature winding 2 and a field winding 3. The armature winding 2 is arranged to be connected to an energized polyphase system 4 by means of a circuit breaker 5 which may be of any suitable type, examples of which are well known in the art. The generator 1 may be driven by any suitable type of prime mover (not shown).

For supplying excitation to the field winding 3, I have shown a direct connected exciter 6 which is arranged to be connected across the terminals of the field winding 3 through suitable current limiting means such as a resistor 7 when a field switch 8 is closed and directly across the terminals of the field winding 3 when a second field switch 9 is closed. The resistor 7 is so designed that, when the switch 8 is closed and the switch 9 is open, the amount of direct current supplied to the field winding 3 is only sufficient to produce a subnormal voltage across the armature terminals of the generator 1 which is reasonably free from variations in magnitude, due to previous magnetization of the field structure, but is not sufficient to pull the generator 1 into synchronism when the generator is connected to the system 4. Usually this subnormal voltage is approximately 10 per cent of the normal terminal voltage of the generator 1.

For effecting the closing of the circuit breaker 5 when the speed of the generator is above a predetermined value, I first close the switch 8 so that the field winding 3 is excited by a small amount of direct current and then control the closing of the circuit breaker 5 in response to the frequency of the terminal voltage of the generator 1 exceeding a predetermined value. In the embodiment of my invention shown in the drawing, the closing of the switch 8 is effected in response to the exciter voltage building up to a predetermined value by having the operating winding 10 of the switch 8 normally connected across the terminals of the exciter 6 by the auxiliary contacts 11 of the switch 5. For effecting the closing of the switch 5 in response to the frequency of the subnormal voltage of the generator 1, I provide a relay 13 the winding of which is connected in series with a suitable condenser 14 across one phase of the armature winding 2 by means of a suitable transformer 12 when the auxiliary contacts 16 of the field switch 8 are closed. The circuit of the relay 13 and the condenser 14 is tuned so that the relay 13 does not receive sufficient current to effect the operation thereof until the frequency of the subnormal voltage of the generator 1 is above a predetermined value. When the relay 13 operates, it effects the operation of a control relay 15 which in turn effects the closing of the circuit breaker 5 and the opening of the field switch 8. As soon as the circuit breaker 5 closes its auxiliary contact 17 completes an energizing circuit for the operating winding 18 of the switch 9 so that normal excitation is applied to the field winding 3 to cause the generator 1 to be pulled into synchronism.

The operation of the arrangement shown is as follows: When it is desired to place the generator 1 in operation, the generator is brought up to approximately synchronous speed by controlling the speed of the prime mover which drives the generator. As soon as the voltage of the direct connected exciter builds up to a predetermined value, the field switch 8 closes so that the field winding 3 is excited sufficiently to produce a subnormal terminal voltage of approximately 10 per cent of the normal terminal voltage. The energizing circuit of the operating winding 10 of the switch 8 is normally completed across the terminals of the exciter 6 through the contacts 11 of the circuit breaker 5 and the contacts 19 of the relay 15.

When the generator reaches the desired synchronizing speed, the frequency of the subnormal terminal voltage of the generator is such that the frequency relay 13 closes its contacts 20 and completes, through contacts 11 of the circuit breaker 5, an energizing circuit for the control relay 15. By closing its contacts 21, control relay 15 completes an energizing circuit for the closing coil 22 of the circuit breaker 5 so that the generator 1 is connected to alternating current circuit 4. The circuit breaker 5 is shown as being held in closed position by a suitable latch 23, but any other suitable means may be provided for maintaining the circuit breaker in its closed position after the closing coil 22 has become de-energized.

By opening its contacts 19, the relay 15 effects the opening of the field switch 8 which in turn by opening its contacts 16 disconnects the low voltage relay 13 from the transformer 15 before the generator voltage is increased to normal. Relay 15 may have a time delay drop out so as to insure that it does not close its contacts 19 and effect the reclosing of the field switch 8 before the circuit breaker 5 can close.

When the circuit breaker 5 closes its auxiliary contacts 17, a circuit is completed for the operating winding 18 of the field switch 9 so that the excitation of the generator 1 then builds up to its normal value and causes the generator to pull into synchronism with the system 4.

While I have, in accordance with the Patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States, is:

1. In combination, an alternating current system, a synchronous machine, means for supplying said machine with an excitation which produces a relatively low subnormal terminal voltage but which is not sufficient to pull said machine into synchronism when connected to said system, and means responsive to the frequency of said subnormal voltage and independent of the frequency of said system for connecting said machine to said system.

2. In combination, an alternating current system, a synchronous machine, means for supplying said machine with an excitation which produces a relatively low subnormal terminal voltage but which is not sufficient to pull said machine into synchronism when connected to said system, and means responsive to the frequency of said subnormal voltage and independent of the frequency of said system for connecting said machine to said system and for increasing the excitation of said machine.

3. In combination, an alternating current system, a synchronous machine, means dependent upon the speed of said machine being above a predetermined value for supplying said machine with an excitation which produces a relatively low subnormal terminal voltage but which is not sufficient to pull said machine into synchronism when connected to said system, and means responsive to the frequency of said subnormal voltage and independent of the frequency of said system for connecting said machine to said system.

4. In combination, an alternating current system, a synchronous machine, means dependent upon the speed of said machine being above a predetermined value for supplying said machine with an excitation which produces a relatively low subnormal terminal voltage but which is not sufficient to pull said machine into synchronism when connected to said system, and means responsive to the frequency of said subnormal voltage and independent of the frequency of said system for connecting said machine to said system and for increasing the excitation of said machine.

5. In combination, an alternating current system, a synchronous machine having a field winding, means for supplying said machine with an excitation which produces a relatively low subnormal terminal voltage but which is not sufficient to pull said machine into synchronism when connected to said system comprising a source of excitation, impedance means, and means for connecting said source of excitation and said impedance means in circuit with said field winding, and means responsive to the frequency of the voltage of said machine when said source and impedance means are connected in a series circuit with said field winding and independent of the frequency of said system for connecting said machine to said system.

6. In combination, an alternating current system, a synchronous machine having a field winding, a source of excitation, impedance means, means controlled by the speed of said machine for connecting said source of excitation and said impedance means in circuit with said field winding, means responsive to the frequency of the voltage of said machine when said source and impedance means are connected in a series circuit with said field winding and independent of the frequency of said system for connecting said machine to said system, and means responsive to the connection of said machine to said system for connecting said source to said field winding without said impedance means being connected in series therewith.

7. In combination, an alternating current system, a synchronous machine having a field winding, current limiting means, a source of excitation, a field switch for connecting said current limiting means and said source in series with said field winding, means for closing said switch, frequency responsive means, means responsive to the closing of said field switch for connecting said frequency responsive means across the terminals of said machine, means controlled by said frequency responsive means for effecting the connection of said machine to said system and the disconnection of said frequency responsive means from across the terminal of said machine when said frequency of the terminal voltage of said machine is above a predetermined value, and means for subsequently connecting said source in series with said field winding without said current limiting means.

8. In combination, an alternating current system, a synchronous machine having a field winding, current limiting means, a source of excitation, a field switch for connecting said current limiting means and said source in series with said field winding, means for closing said switch, frequency responsive means, means responsive to the closing of said field switch for connecting said frequency responsive means across the terminals of said machine, a second field switch for connecting said source directly to said field winding, means controlled by said frequency responsive means for effecting the connection of said machine to said system and the opening of said first mentioned field switch when the frequency of the terminal voltage of said machine is above a predetermined value, and means for closing said second mentioned field switch after said machine is connected to said system.

HERMAN BANY.